United States Patent
Vlad et al.

(10) Patent No.: US 11,720,761 B2
(45) Date of Patent: Aug. 8, 2023

(54) SYSTEMS AND METHODS FOR INTELLIGENT ROUTING OF SOURCE CONTENT FOR TRANSLATION SERVICES

(71) Applicant: SDL Inc., Wakefield, MA (US)

(72) Inventors: Mihai Vlad, London (GB); Abdessamad Echihabi, Los Angeles, CA (US)

(73) Assignee: SDL Inc., Wakefield, MA (US)

( * ) Notice: Subject to any disclaimer, the term of this patent is extended or adjusted under 35 U.S.C. 154(b) by 0 days.

(21) Appl. No.: 17/944,956

(22) Filed: Sep. 14, 2022

(65) Prior Publication Data

US 2023/0004732 A1    Jan. 5, 2023

Related U.S. Application Data

(63) Continuation of application No. 17/077,994, filed on Oct. 22, 2020, now Pat. No. 11,475,227, which is a
(Continued)

(51) Int. Cl.
| | |
|---|---|
| *G06F 40/58* | (2020.01) |
| *G06F 16/34* | (2019.01) |
| *G06N 3/04* | (2023.01) |
| *G06F 16/31* | (2019.01) |
| *G06Q 10/101* | (2023.01) |
| *G06Q 10/10* | (2023.01) |
| *G06F 40/51* | (2020.01) |

(Continued)

(52) U.S. Cl.
CPC ............ *G06F 40/58* (2020.01); *G06F 16/313* (2019.01); *G06F 16/345* (2019.01); *G06F 40/166* (2020.01); *G06F 40/216* (2020.01); *G06F 40/284* (2020.01); *G06F 40/51* (2020.01); *G06N 3/04* (2013.01); *G06Q 10/101* (2013.01); *G06Q 10/103* (2013.01)

(58) Field of Classification Search
CPC ...... G06F 40/58; G06F 16/313; G06F 16/345; G06F 40/166; G06F 40/216; G06F 40/284; G06F 40/51; G06N 3/04; G06N 3/08; G06N 7/01; G06N 7/005; G06Q 10/101; G06Q 10/103
See application file for complete search history.

(56) References Cited

U.S. PATENT DOCUMENTS

| | | |
|---|---|---|
| 10,817,676 B2 | 10/2020 | Vlad et al. |
| 11,475,227 B2 | 10/2022 | Vlad et al. |

(Continued)

*Primary Examiner* — Yogeshkumar Patel
(74) *Attorney, Agent, or Firm* — Carr & Ferrell LLP

(57) ABSTRACT

A source content routing system is described for distributing source content received from clients such as documents, to translators for performing translation services on the source content. The routing system extracts source content features, which may be represented as vectors. The vectors may be assembled into an input matrix, which may be processed using an artificial neural network, classifier, perceptron, CRF model, and/or the like, to select a translator such as a machine translation system and/or human. The translator provides translation services translation from a source language to a target language, post translation editing, proof reading, quality analysis of a machine, quality analysis of human translation, and/or the like and returns the product to the content routing system or clients.

24 Claims, 4 Drawing Sheets

Related U.S. Application Data continuation of application No. 16/226,419, filed on Dec. 19, 2018, now Pat. No. 10,817,676.

(60) Provisional application No. 62/610,591, filed on Dec. 27, 2017.

(51) Int. Cl.
*G06F 40/166* (2020.01)
*G06F 40/216* (2020.01)
*G06F 40/284* (2020.01)

(56) References Cited

U.S. PATENT DOCUMENTS

| | | | |
|---|---|---|---|
| 2011/0066469 A1* | 3/2011 | Kadosh | G06Q 50/10 |
| | | | 705/7.27 |
| 2011/0137636 A1* | 6/2011 | Srihari | G06F 40/53 |
| | | | 704/2 |
| 2016/0162473 A1 | 6/2016 | Cogley et al. | |
| 2016/0162478 A1 | 6/2016 | Blassin et al. | |
| 2017/0046333 A1 | 2/2017 | Mirkin et al. | |
| 2017/0169015 A1* | 6/2017 | Huang | G06F 40/51 |
| 2019/0197116 A1 | 6/2019 | Vlad et al. | |
| 2021/0042476 A1 | 2/2021 | Vlad et al. | |
| 2023/0004732 A1 | 1/2023 | Vlad et al. | |

\* cited by examiner

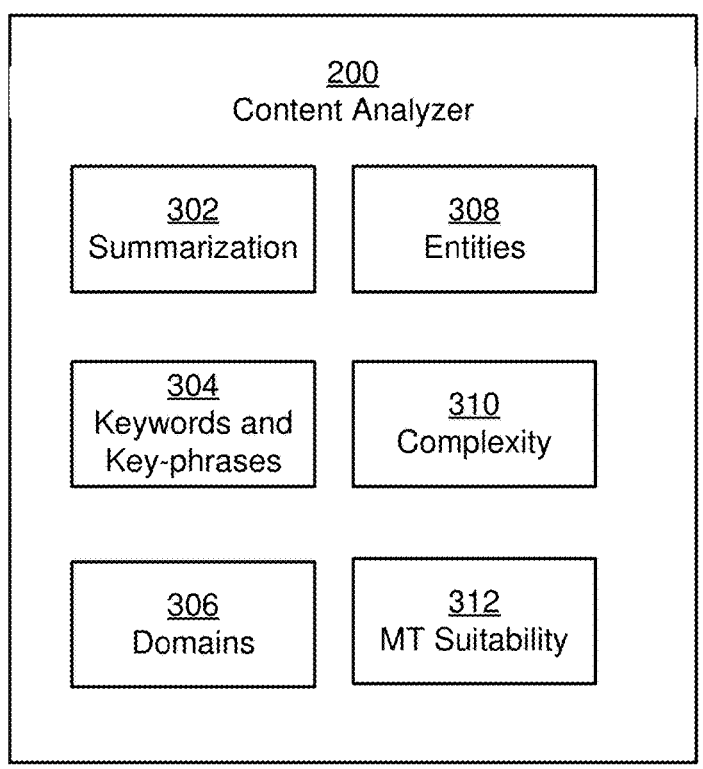
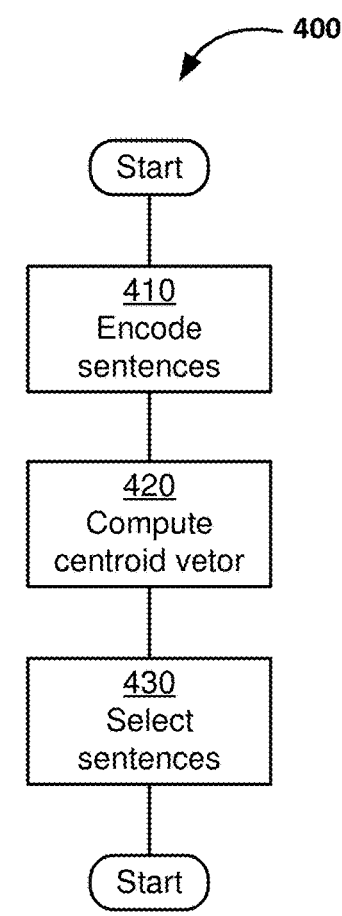
FIG. 3
FIG. 4

SYSTEMS AND METHODS FOR INTELLIGENT ROUTING OF SOURCE CONTENT FOR TRANSLATION SERVICES

CROSS-REFERENCE TO RELATED APPLICATIONS

The present application is a continuation of U.S. patent application Ser. No. 17/077,994, filed on Oct. 22, 2020 and titled "Intelligent Routing Services and Systems," which is a continuation of U.S. patent application Ser. No. 16/226,419, filed on Dec. 19, 2018 and titled "Intelligent Routing Services and Systems," which claims priority and benefit to U.S. provisional patent application Ser. No. 62/610,591 filed on Dec. 27, 2017 and titled "Intelligent Routing Services and Systems," which are all incorporated by reference herein in their entirety.

FIELD OF THE PRESENT TECHNOLOGY

The present disclosure relates to the technical field of machine translation systems and methods. More particularly, the present invention is in the technical field of distribution of documents between machine translators, human translators, and post translation editors.

BACKGROUND

The translation process in a typical language service provider is orchestrated by a human Project Manager who collects requests from customers or prospects. The project manager then analyzes content of the source documents to price the work. The project manage then makes a decision based on personal experience and knowledge of available translators on how best distribute the source documents to the translators. The project manager is also responsible for ensuring delivery of the completed work back to the customer. Currently, tools do not exist for equipping project managers to make fast and accurate decisions.

SUMMARY

Various embodiments of the present technology include a hardware solution for a way of improving the routing of source content such as documents to translators for translation services. The present technology improves on a human selection of a translator manually based personal experience with known translators and a cursory read of a source document to develop an impression of the content. Instead, the claimed technology provides a way of selecting of routing a document that includes performing a stochastic analysis of the source content to extract source content feature and generate vectors from the extracted features. These feature vectors may then be assembled into an input matrix representing source content features. A router may use an artificial neural network including hidden layers along with weight matrixes representing connections between layers and a target matrix representing translators for processing the input matrix to select a translator, and may transfer the document to the selected translator for translation services.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 3 is a block diagram illustrating exemplary details of the content analyzer of FIG. 2.

FIG. 4 illustrates an algorithm for summarizing source content.

DETAILED DESCRIPTION

Figure 1:
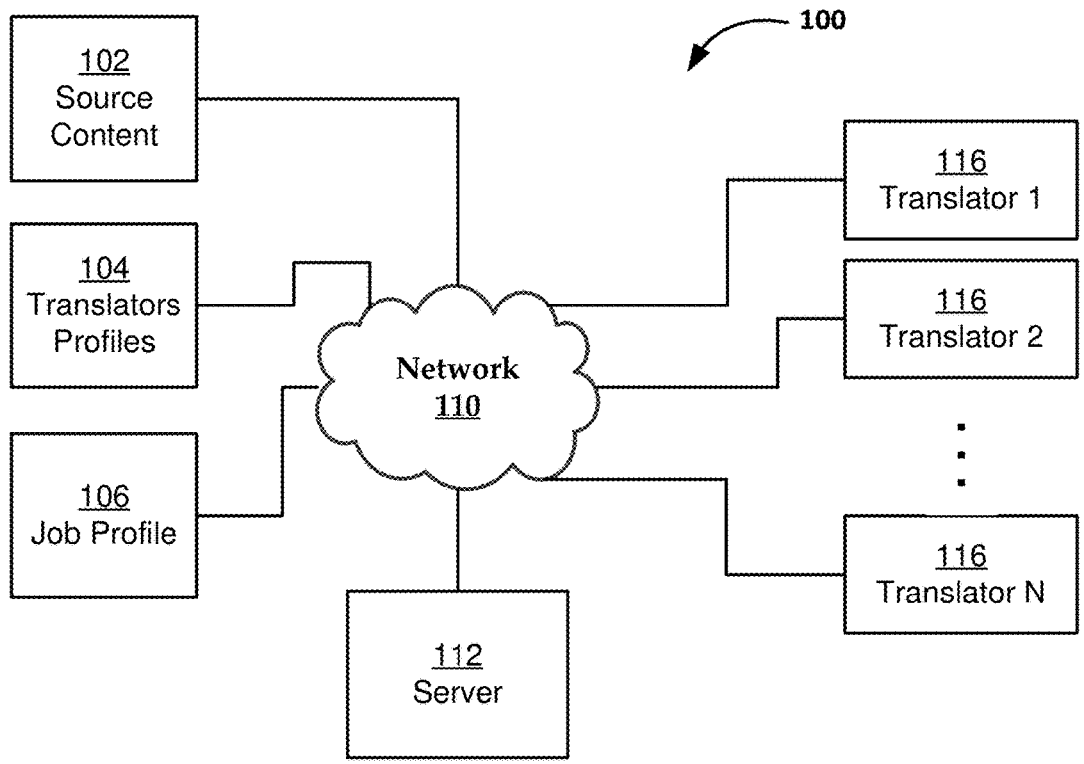
FIG. 1 is a block diagram illustrating an environment for routing documents to translators, in accordance with aspects of the technology.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more of the same or other features, integers, steps, operations, elements, components, and/or groups thereof.

It will be understood that like or analogous elements and/or components referred to herein may be identified throughout the drawings with like reference characters. It will be further understood that several of the figures are merely schematic representations and/or block diagrams of the present technology. As such, some of the components may have been distorted from their actual scale for pictorial clarity.

FIG. 1 is a block diagram illustrating an environment 100 for routing documents to translators. The environment 100 of FIG. 1 includes a network 110, a content distribution server 112, source content 102, profiles of a plurality of translators (translators profiles 104), a job profile 106, and a plurality of translators 1-N, i.e., translators 116. The content distribution server 112 is a special purpose computer system configured specifically to receive source content 102 and route the source content 102 to one or more of the plurality of translators 116. In some embodiments, the content distribution server 112 is configured to receive source content 102 via a network 110. The server may also receive translator profiles 104, and a job profile 106 via the network 110. The content distribution server 112 may route the source content 102 to one or more translators 116 via the network 110 based on an analysis of the source content 102, the translator profiles 104, and the job profile.

In various embodiments, translation services include translation from a source language to a target language, post translation editing, proof reading, quality analysis of a machine, quality analysis of human translation, and/or the like. Translators 116 include machine translation systems, human translators using machine-assisted translation platforms, interactive adaptive machine translations systems, and/or the like.

In various embodiments, the source content 102 includes text, a document, a batch of documents, or a portion of a document. Documents include various combinations of text, images, graphs, drawings, videos, audio, animation, media, web pages, links to web pages, web objects, and/or the like.

The translator profiles include information about translators 116, such as previous work content, quality, speed, schedule, time zone, target language skills (speed, quality, etc.) for one or more target languages, post editing skills (speed, quality, etc.), domain skills for one or more domains, source content in progress, and/or the like. Additional information about the translators 116 includes previous association of a translator with the type of document the job requires (e.g., familiarity with a document may enhance the speed of delivery and consistency); domain preference (e.g., efficiency within a domain); association with a document or similar document; translator native language. Translator quality features include overall quality/rating, translator quality/rating on a given domain/content type, translator experience/qualification, reliability and consistency, translator workload, translator availability, translator preference (comfortable with MT Post Editing). The translators profiles 104 may include information about all the translators 116 or some of the translators 116. In some embodiment the translators profiles 104 include information about translators that are not included in the translators 116.

In various embodiments the job profile 106 includes information about how the job is to be processed, such as target language, cost, margin, time, deadlines, desired quality, translation, post translation editing, inspection, and/or the like.

The content distribution server 112 may route the entire source content 102 to a single translator 116, or a portion of the source content 102 may be routed to the single translator 116. In some embodiments the source content 102 is separated into portions of the content are routed multiple translators 116. For example, source content 102 may include a batch of documents, and the documents may be routed to translators 116 such that part of the documents are routed to a machine translation system, part of the documents are routed to a first human translator 116, part to a second human translator 116, and so on.

It may be appreciated that one or more of the source content 102, translators profiles 104, and/or the job profile 106 may be communicated directly to the content distribution server 112 or may be generated at the content distribution server 112. It may be further appreciated that one or more translators 1-N(translators 116) may be in direct communication with the content distribution server 112. In some embodiments, one or more translators 116 are a part of the content distribution server 112, for example, in the case of a translator that includes machine translation services. The content distribution server 112 may route the source content 102 directly to one or more of the translators 116.

In some embodiments one or more of the network 110, content distribution server 112, source content 102, translators profiles 104, job profiles 106, and a plurality of translators 116 (e.g., machine translator systems) FIG. 1 are implemented within a cloud-based computing environment (not illustrated) In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

A cloud based environment may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Figure 2:
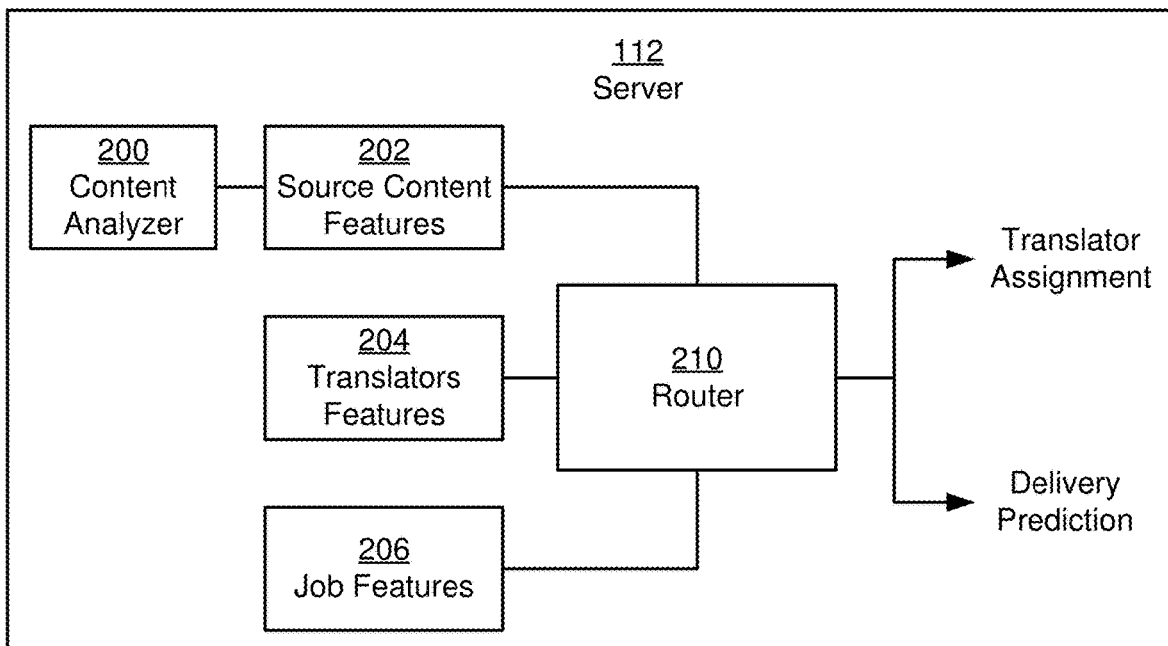
FIG. 2 is a block diagram illustrating a server for routing source content to translators, in accordance with aspects of the technology.

FIG. 2 is a block diagram illustrating exemplary details of a content distribution server 112 for routing the source content 102 to the translators 116. As discussed elsewhere herein, the content distribution server 112 is a special purpose computer system that includes specific components for accomplishing special tasks. The content distribution server 112 of FIG. 2 includes a content analyzer 200, source content features 202, translators features 204, job features 206, and a router 210. The content analyzer 200 is configured to extract source content features 202 from the source content 102. In various embodiments, the source content features 202 include a summary of the source content 102, keywords in the source content 102, key-phrases in the source content 102, one or more domains identified as being related to the source content 102, one or more entities being recognized as a source of the source content 102, a complexity of the source content 102, a suitability of the source content 102 for machine translation, and/or the like. Each of the source content features 202 may be represented as a vector of the features (content feature vector). In various embodiments, content feature vectors include a summary vector, keywords and key-phrases vector, domains vector, entities vector, complexity vector, and MT suitability vector. In some embodiments, the source content features 202 are represented as a matrix. Each of the content feature vectors (summary vector, keywords and key-phrases vector, domains vector, entities vector, complexity vector, and MT suitability vector) may be used as a column or row of the matrix.

The translators features 204 may be extracted from the translators profiles 104 at the content distribution server 112. In some embodiments, the translators features 204 are generated at the translators profiles 104 and then received from the translators profiles 104. In various embodiments, the translators features 204 include previous work content, quality, speed, schedule, time zone, target language skills (speed, quality, etc.) for one or more target languages, post editing skills (speed, quality, etc.), domain skills for one or more domains, source content 102 in progress, and/or the like. The translators features 204 may be represented as a vector of the features (translator feature vector). In various embodiments, the translator feature vectors represent the previous work content, quality, speed, schedule, time zone, target language skills, post editing skills, domain skills, load, etc. Each of a plurality of translators may be represented by a translator feature vector. The translators features 204 may include a plurality of translator feature vectors, one for each of a plurality of translators. In some embodiments, the translators features 204 are represented as a matrix. Each of the translator feature vectors may be used as a column or row of the matrix.

The job features 206 may be extracted from the job profile 106 at the content distribution server 112. In some embodiments, the job features are generated at the job profile 106 and then received from the job profile 106. In various embodiments, the job features 206 include job information, such as cost, margin, time, quality, target language, and/or the like. The job features 206 may be represented as a vector of the features such as the cost, margin, time, quality, target language, etc.

The router 210 is configured to select translators and route content to the translators. The router 210 may receive the source content features 202, the translators features 204, and the job features 206 as input. The router may select one or more translators 116 based on the source content features 202, translators features 204, and job features 206. The source content features 202 may be received as a matrix or as one or more vectors. Similarly, the translators features 204 and/or the job features 206 may be received as a matrix or one or more vectors. In some embodiments, the router 210 is a special purpose processor for using the source content features 202 in conjunction with translators features 204 and the job features 206 for selecting a translator 116 and routing the source content 102 to the selected translator 116. The source content 102 may be divided into a plurality of portions. The router 210 may select a plurality of translators 116 and one or more portions of the source content 102 may be routed to each of the selected translators 116.

While the content analyzer 200, source content features 202, translators features 204, job features 206, and router 210 of FIG. 2 are illustrated as being components of a content distribution server 112, any combination of one or more of these components may be disposed in a standalone computer system, a mobile device, a cloud-based computing environment, and/or the like. For example, the content analyzer 200 and source content features 202 may be components of the source content 102. Similarly the translator features 204 may be component of the translators profiles 104 and/or a job features 206 may be a component of the job profile 106. While the content distribution server 112 of FIG. 2 is illustrated as including the content analyzer 200, source content features 202, translators features 204, job features 206, and router 210, more or fewer components may be included in the content distribution server 112. For example, the content distribution server 112 may include a machine translation system.

FIG. 3 is a block diagram illustrating exemplary details of the content analyzer 200 of FIG. 2. The content analyzer 200 includes means for extracting source content features 202 represented by vectors from the source content 102. The content analyzer 200 is a special purpose computer system configured specifically to receive source content 102, extract source content features 202 from the received source content 102, and generate vectors representing the extracted source content features 202. The content analyzer 200 of FIG. 3 includes a summarization module 302, a keywords and key-phrases module 304, a domains module 306, an entities module 308, a complexity module 310, and a machine translation suitability module 312. More or fewer modules may be included in the content analyzer 200.

The summarization module 302 includes a means for extracting sentences from the source content 102. The extracted sentences may be represented in the form of vectors for use as source content features 202. The summary features may comprise vector representations of sentences selected from the source content 102. The summarization module 302 may use a centroid based approach that includes neural vector representations of text segments.

FIG. 4 illustrates an algorithm for summarizing source content 102. At 410 each sentence in the source text may be encoded into a vector representation. At step 420, a centroid vector may be computed as a sum of the sentence vector representations encoded in step 410. At step 430, sentences with highest cosine similarity to the centroid vector may be selected for inclusion in summary. The summary features may comprise vector representations of the selected sentences. Persons having ordinary skill in the relevant arts would understand with the present application before them how to use a special purpose computer module to encode sentence text as vector representations, compute centroid vectors from sentence vector representations and determining cosine similarity between sentences, and centroid vectors for use as source content features 202.

The keywords and key-phrases module 304 includes means for extracting keywords and key-phrases from the source content 102. The extracted keywords and key-phrases may be represented in the form of vectors for use as source content features 202. An example of means for extracting keywords and/or key-phrases is nonparametric spherical topic modeling of the source content 102 with word embeddings for extracting keywords and/or key-phrases. Another example is non-parametric latent Dirichlet analysis of the source content 102, for example a hierarchical Dirichlet process mixture model, which allows the number of keywords and/or key-phrases for topics to be unbounded and learned from data. Yet another example is classifying the source content 102 using numerical statistical analysis including term frequency—inverse document frequency (Tf-Idf), for example, to calculate the importance of words and/or word phrases in the source content 102 and rank the words and phrases. The keyword and key-phrase features may comprise vector representations of key words and key-phrases. Persons having ordinary skill in the relevant arts would understand with the present application before them how to construct and use a special purpose computer module to extract keywords and key-phrases using techniques such as nonparametric spherical topic modeling with word embeddings, non-parametric latent Dirichlet analysis, and Tf-Idf technologies applied to source content 102. Persons having ordinary skill in the relevant arts would understand with the present application before them how to generate a vector representation of a plurality of keywords and/or key-phrases for use as a source content feature 202.

The domain identification module 306 includes means for identifying one or more domain of source content 102. The identified domains may be represented in the form of vectors for use as source content features 202. In various embodiments the means includes a multilayer perceptron, a Term Frequency, an Inverse Document Frequency, and a weighted bag of words to generate a domain feature vector. The domain feature vector may include values representing one or more domains that the source content 102 is related to.

Figure 5:
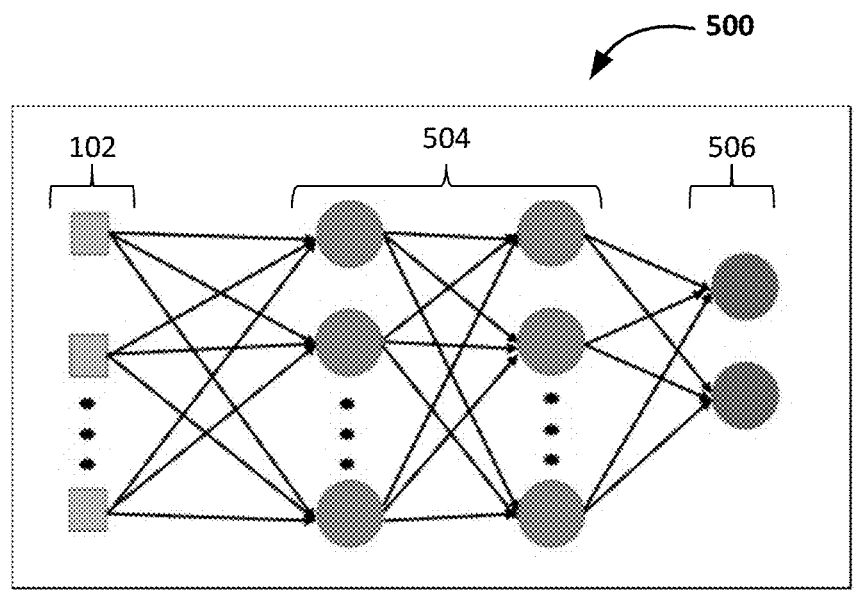
FIG. 5 is an illustration of a multilayer perceptron.

FIG. 5 is an illustration of a multilayer perceptron 500. The multilayer perceptron 500 of FIG. 5 includes as inputs the source content 102 and as output the domain feature vector 506. The domain feature vector 506 may include an array of one or more values. Each value may represent a score or probability that the source content 102 is related to a specific domain. In various embodiments, the hidden layers 504 include a weighted bag of words layer, TF layer, IDF layer, and/or the like. Persons having ordinary skill in the relevant arts would understand with the present application before them how to use a special purpose computer module to identify one or more domains for the source content 102 using various combinations of multilayer perceptron 500 and hidden layers 504 including TF, layers, IDF layers, weighted bag of words layers, and/or like technologies, to generate domain feature vectors for use as source content features 202.

The entity recognition module 308 includes means for recognizing named entities in source content 102. The named entities may be represented in the form of vectors for use as source content features 202. In various embodiments the means includes Conditional Random Field model (CFR) and entity recognition technology. CRFs are a type of discriminative undirected probabilistic graphical model. CRF's may be used to encode known relationships between observations and construct consistent interpretations. CRF's are often used for labeling or parsing of sequential data, such as natural language processing. Specifically, CRFs find applications in named entity recognition. Entity recognition (also known as named entity recognition(NER), entity identification, entity chunking and entity extraction) is a subtask of information extraction that seeks to locate and classify named entities occurring in unstructured text, into predefined categories such as the person names, organizations, locations, medical codes, time expressions, quantities, monetary values, percentages, etc. The entity feature vector includes values representing one or more categories of entities that occur in the source content 102.

Figure 6:
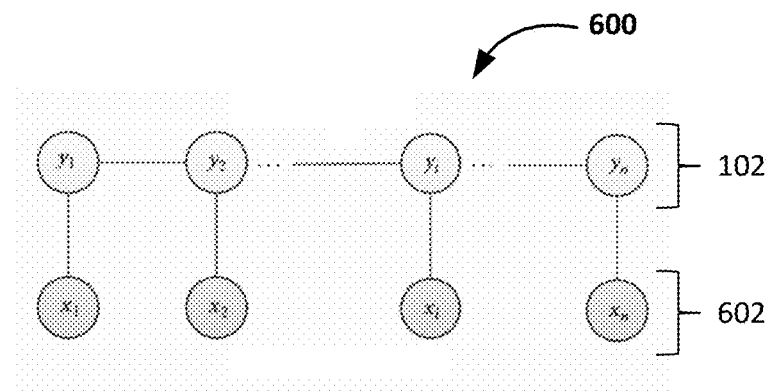
FIG. 6 is a diagram of an undirected probabilistic graphical CRF model for entity recognition using CFR.

FIG. 6 is a diagram 600 of an undirected probabilistic graphical CRF model for entity recognition using CFR. The diagram 600 includes as inputs the source content 102, which may encode relationships between the source content 102 and sequential data including as observation data in the form of an entity feature vector 602. The entity feature vector 602 may include an array of one or more values. Each value may represent a score or probability that an entity has been recognized or identified in the source content 102. In some embodiments, encoding relationships between the source content 102 and the entity feature vector 602 includes hand crafting the relationships. Persons having ordinary skill in the relevant arts would understand with the present application before them how to use a special purpose computer module to recognize or identify one or more entities in the source content 102 using CFR applied to recognition technologies, to generate entity feature vectors for use as source content features 202.

The complexity module 310 includes means for calculating complexity of the source content 102. The calculated complexity may be represented in the form of vectors for use as source content features 202. In various embodiments the means for calculating complexity of the source content 102 include means for calculating syntactic complexity, lexical complexity, uber index complexity, Flesch Kincade complexity score, and overall complexity, of the source content 102.

Syntactic complexity may be calculated from various combinations of a part of speech ratio, constituency tree depth ration and constituent ratio.

Lexical complexity (sometimes referred to as lexical richness) may be calculated for the source content 102, for example using a Herdan ratio:

$$TTR = \frac{V}{N}$$

where TTR is a type-token ratio, V is vocabulary, and N is text length. A normalized Herdan Index H may also be calculated from:

$$H = \frac{\log V}{\log N}$$

Examples of modifications of a Herdan index include those proposed by:

$$\text{Dugast: } D = \frac{\log V}{\log(\log N)}$$

An Uber index may be calculated from:

$$UberIndex = \frac{(\log \text{tokens})^2}{\log \text{tokens} - \log \text{types}}$$

A Flesch Kincaid score F (or Flesch reading-ease score) may be calculated from a formula:

$$F = 206.835 - 1.015 \frac{T_{words}}{T_{sentences}} - 84.6 \frac{T_{syllables}}{T_{words}}$$

Where "$T_{words}$" is the total number of words, "$T_{sentencess}$" is the total number of sentences and "$T_{syllables}$" is the total number of syllables in the source content 102. The meaning of the score F may be indicated by table 1 below.

TABLE 1

| Score | School level | Notes |
| --- | --- | --- |
| 100.0-90.0 | 5th grade | Very easy to read. Easily understood by an average 11-year-old student. |
| 90.0-80.0 | 6th grade | Easy to read. Conversational English for consumers. |
| 80.0-70.0 | 7th grade | Fairly easy to read. |
| 70.0-60.0 | 8th & 9th grade | Plain English. Easily understood by 13- to 15-year-old students |
| 60.0-50.0 | 10th to 12th grade | Fairly difficult to read. |
| 50.0-30.0 | College | Difficult to read. |
| 30.0-0.0 | College graduate | Very difficult to read. Best understood by university graduates. |

The complexity features may comprise vector representations of complexity scores. Persons having ordinary skill in the relevant arts would understand with the present application before them how to construct and use a special purpose computer module to calculate complexity scores for syntactic complexity, lexical complexity, Uber index, FleschKincaid score, and overall complexity using information about the source content 102 and techniques including POS ratio, Constituency tree depth ration, constituent ratio, vocabulary size, text length, normalized Herdan Index log tokens, log types, total words, total sentences, total syllables applied to source content 102 to generate complexity vectors for use as source content features 202.

The machine translation (MT) suitability module 312 includes means for calculating machine translation suitability of the source content 102. The calculated MT suitability may be represented in the form of vectors for use as source content features 202. In various embodiments the means for calculating machine translatability include calculating a MT suitability score where:

$T_{words}$ is the total number of words in source content 102
P=probability of each sentence of source content 102
Raw LM score per sentence is LM=− log(P)
The Document perplexity may be calculated from the relation:

$$\text{Perplexity} = e^{\frac{\Sigma_{Sentences} LM}{T_{words}}}$$

The ME suitability score may be calculated as:

$$MT_{suitability} = \max\left(5, \min\left(5 - 4\frac{\text{Perplexity} - 10}{70}, 1\right)\right)$$

where the scaled document perplexity is calculated using a language model trained on NMT parallel data resources.

The MT suitability features may comprise vector representations of the suitability of the source content 102 for translation using one or more machine translation technologies. Persons having ordinary skill in the relevant arts would understand with the present application before them how to construct and use a special purpose computer module to calculate a MT suitability score using techniques such as sentence probability, LM score, document Perplexity and the equation for MT suitability score applied to source content 102 to generate vector representations of MT suitability for use as source content features 202. A different MT suitability score may be generated from the source content 102 for each of a plurality of types of machine translators. It is noteworthy that MT suitability is an important feature to use in determining where to route a document because machine translation is substantially faster and less expensive than human translation.

In various embodiments, the router 210 is a neural network, a classifier, a matrix, a search engine, decision tree, a finite state acceptor, and/or the like. In the example of the router 210 being a neural network, the source content features 202 may be received by the router 210 from the content analyzer 200 as an input matrix representing the source content features 202, or as a plurality of feature vectors representing the source content features 202.

For example, each of the source features generated by the content analyzer 200 using modules 302-312 may be represented as one or more feature vectors. The router 210 may receive the plurality of feature vectors from the content analyzer 200 and assemble the feature vectors into an input matrix including columns comprising the feature vectors. In some embodiments, the content analyzer 200 assembles the generated feature vectors into columns of the input matrix. Input matrix is then received from the content analyzer 200 by the router 210 as a representation of the source content features 202. The router 210 may also assemble feature vectors for the translators features 204 and/or the job features 206 into additional columns of the input matrix.

The router 210 may be an artificial neural network (e.g., a multi-layer perceptron) for processing complex inputs such as presented by the input matrix assembled from feature vectors generated by the content analyzer 200 and representing source content features 202. Connections between one or more layers of the neural network may be represented by a weight matrix or more than one weight matrix. A target matrix may be formed, e.g., having columns for the translators 116. The translator columns may be vectors that include weights representing delivery predictions for features such as cost, margin, time, quality. Persons having ordinary skill in the relevant arts would understand with the present application before them how to construct and use a special purpose computer router 210 using artificial neural network technology to train a weight matrix and process to process an input matrix and target matrix for selecting one or more translators 116 to provide translation services for source content 102.

In some embodiments, a router 210 is a classifier that ranks translators based on the source content 102 and/or the source content features 202, translators features 204, and job features 206. The router 210 may output a delivery prediction score for each of various categories of delivery prediction for each translator. Delivery prediction categories for each translator 116 may include cost, margin, time, quality, and/or the like. The delivery prediction scores may be used for selecting a translator 116.

Figure 7:
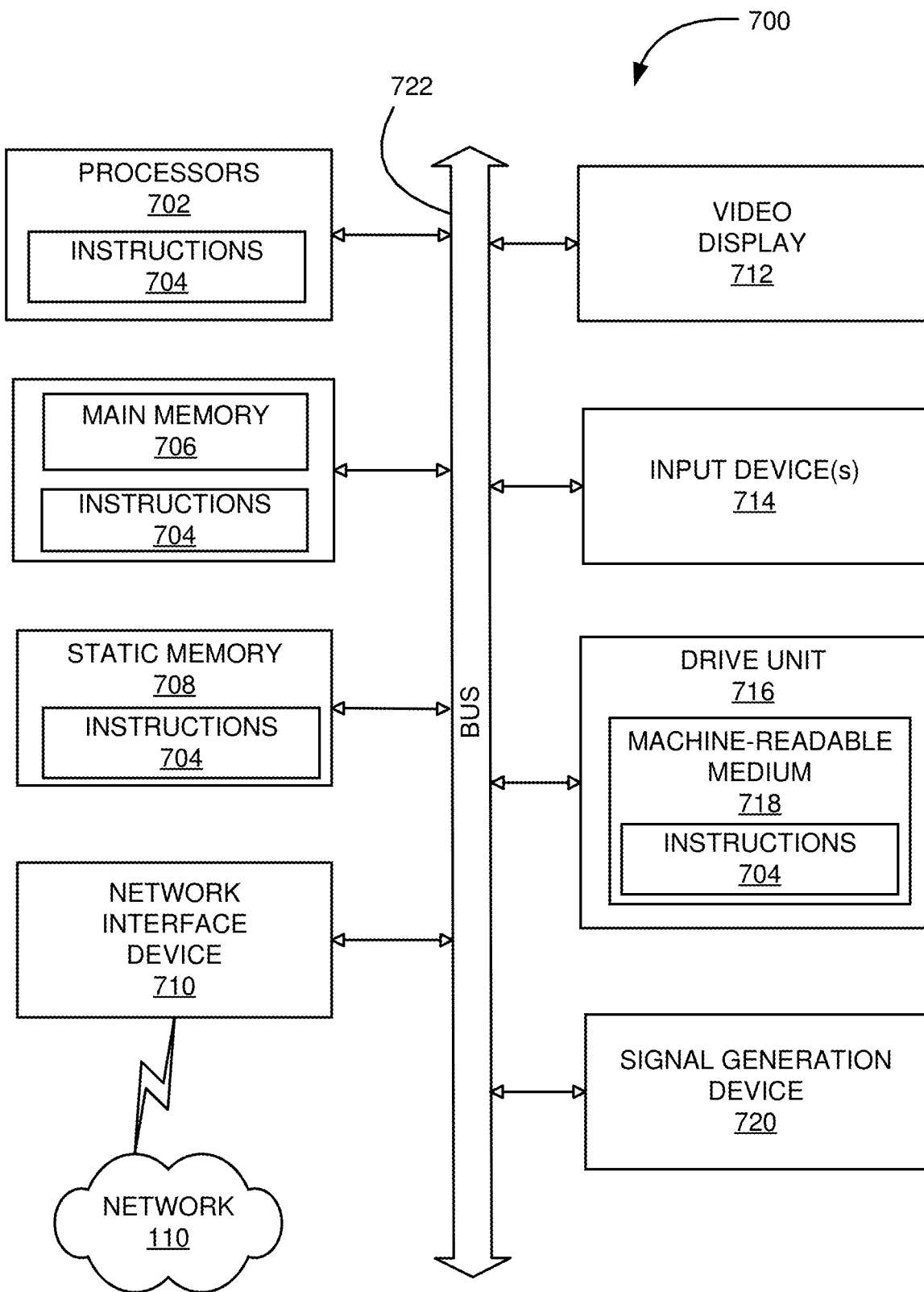
FIG. 7 is a diagrammatic representation of an example machine in the form of a computer system, within which a set of instructions for causing the machine to perform any of one or more of the methodologies discussed herein may be executed.

FIG. 7 is a diagrammatic representation of an example machine in the form of a computer system 700, within which a set of instructions for causing the machine to perform any of one or more of the methodologies discussed herein may be executed. In various example embodiments, the machine operates as a standalone device (e.g. content distribution server 112, MT translator 116, content analyzer 200, router 210, and/or other components described in the figures and specification) or may be connected (e.g., networked) to other machines. In a networked deployment, the machine may operate in the capacity of a server (e.g. content distribution server 112) or a client machine, in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated in FIG. 7, the term "machine" shall also be taken to include any collection of machines that individually or jointly execute a set (or multiple sets) of instructions to perform any one or more of the methodologies discussed herein The example computer system 700 includes a processor or multiple processor(s) 702 (e.g., a central processing unit (CPU), a graphics processing unit (GPU), or both), and a main memory 706 and static memory 708, which communicate with each other via a bus 722. The computer system 700 may further include a video display 712 (e.g., a liquid crystal display (LCD)). The computer system 700 may also include an input/output device(s) 714 including alpha-numeric input devices (e.g., a keyboard), a cursor control device (e.g., a mouse, trackball, touchpad, touch screen, etc.), a voice recognition or biometric verification unit (not shown), a drive unit 716 (also referred to as disk drive unit). Input devices may include interfaces for receiving source content 102 via the network 110 and/or directly from clients, and output interfaces for routing source content 102 via the network 110 and/or directly to translators 116. The computer system 700 may further include a signal generation device 720 (e.g., a speaker) and a network interface device 710.

The disk drive unit 716 includes a computer or machine-readable medium 718 on which is stored one or more sets of instructions and data structures (e.g., instructions 704) embodying or utilizing any one or more of the methodologies or functions described herein. The instructions 704 may also reside, completely or at least partially, within the main memory 706 and/or within the processor(s) 702 during execution thereof by the computer system 700. The main memory 706 and the processor(s) 702 may also constitute machine-readable media.

The instructions 704 may further be transmitted or received over a network (e.g., network 110, see FIG. 1) via the network interface device 710 utilizing any one of a number of well-known transfer protocols (e.g., Hyper Text Transfer Protocol (HTTP)). While the machine-readable medium 718 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and/or the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flow diagram illustrations and/or block diagrams of methods, apparatus (systems) and computer program products according to embodiments of the present technology. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagram and block diagrams in the Figures illustrate the architecture, functionality, and operation of possible implementations of systems, methods and computer program products according to various embodiments of the present technology. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art with the instant application before them will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for routing documents for translation services to translators, the method comprising:
   receiving a translator feature for each of a plurality of translators;
   receiving a plurality of job features;
   receiving a document for translation services;
   extracting document content features from content of the document;
   generating an input matrix from the document content features, wherein at least one of the document content features includes a document summary feature comprising a vector representation of a plurality of sentences from the content of the document;
   generating a target matrix for the plurality of translators from the plurality of translator features;
   processing the input matrix using the target matrix for an artificial neural network to select a translator from the plurality of translators; and
   routing the received document to the selected translator for performing the translation services.

2. The method of claim 1, wherein the translator feature comprises one or more components of a translator profile associated with at least one of the plurality of translators.

3. The method of claim 1, further comprising extracting the plurality of job features by a server from a job profile concerning the document for the translation services, the job profile comprising information about how a job is to be processed for translation.

4. The method of claim 3, wherein the plurality of job features comprises information regarding one or more of the following: cost, margin, time, quality, and target language for the job.

5. The method of claim 1, further comprising partitioning the content of the document into a plurality of portions that are to be routed to two or more of the plurality of translators for the translation services.

6. The method of claim 2, wherein the translator profile comprises information about the translator including at least one of the following: previous work content, quality, speed, schedule, time zone, target language skills for one or more target languages, post editing skills, and domain skills for one or more domains.

7. The method of claim 1, wherein generating the input matrix comprises:
   generating a document feature vector for each of the document content features, the document feature vector including one or more values representing the document content feature; and
   assembling the input matrix using a plurality of vectors as columns of the input matrix.

8. The method of claim 1, wherein the document content features include a summarization of the document, a plurality of keywords and key-phrases in the document, an identification of a domain of the document, a recognition of a plurality of named entities in the document, a calculation of complexity of the document, and a calculation of suitability of the document for machine translation.

9. The method of claim 1, wherein generating the target matrix comprises:
   generating a translator feature vector for each of the plurality of translators, each translator feature vector including one or more values representing a feature of the translator; and
   assembling the target matrix using a plurality of vectors as columns of the target matrix.

10. The method of claim 1, further comprising generating the document content features that includes a plurality of summarization features of the document including selected sentences from the document.

11. The method of claim 1, wherein generating the input matrix comprises:
 selecting a plurality of sentences representing the document summary feature for inclusion in a summary vector, the sentences selected by a method of:
  encoding each sentence of the document into a vector representation;
  computing a 'centroid' vector as a sum of these vector representations; and
  selecting sentences having a highest cosine similarity to the centroid vector for inclusion in the summary vector; and
 assembling the input matrix using the summary vector as a column of the input matrix.

12. The method of claim 1, wherein the document content features include a document keyword feature and generating the input matrix comprises:
 selecting a plurality of keywords and key-phrases;
 generating a keyword vector representation of the plurality of keywords and key-phrases; and
 assembling the input matrix using a keyword vector as a column of the input matrix.

13. A system for routing source content to translators for translation services comprising:
 a processor; and
 a memory communicatively coupled to the processor, the memory for storing instructions executable by the processor to perform a method, the method comprising:
  receiving a translator feature for each of a plurality of translators;
  receiving a plurality of job features;
  receiving a document for translation services;
  extracting document content features from content of the document;
  generating an input matrix from the document content features, wherein at least one of the document content features includes a document summary feature comprising a vector representation of a plurality of sentences from the content of the document;
  generating a target matrix for the plurality of translators from the plurality of translator features;
  processing the input matrix using the target matrix for an artificial neural network to select a translator from the plurality of translators; and
  routing the received document to the selected translator for performing the translation services.

14. The system of claim 13, wherein the translator feature comprises one or more components of a translator profile associated with at least one of the plurality of translators.

15. The system of claim 13, wherein the method further comprises extracting the plurality of job features by a server from a job profile concerning the document for the translation services, the job profile comprising information about how a job is to be processed for translation.

16. The system of claim 15, wherein the plurality of job features comprises information regarding one or more of the following: cost, margin, time, quality, and target language for the job.

17. The system of claim 13, wherein the method further comprises partitioning the content of the document into a plurality of portions that are routed to two or more of the plurality of translators for the translation services.

18. The system of claim 14, wherein the translator profile comprises information about the translator including at least one of the following: previous work content, quality, speed, schedule, time zone, target language skills for one or more target languages, post editing skills, and domain skills for one or more domains.

19. The system of claim 13, wherein generating the input matrix comprises:
 generating a document feature vector for each of the document content features, the document feature vector including one or more values representing the document content feature; and
 assembling the input matrix using a plurality of vectors as columns of the input matrix.

20. The system of claim 13, wherein the document content features include a summarization of the document, a plurality of keywords and key-phrases in the document, an identification of a domain of the document, a recognition of a plurality of named entities in the document, a calculation of complexity of the document, and a calculation of suitability of the document for machine translation.

21. The system of claim 13, wherein generating the target matrix comprises:
 generating a translator feature vector for each of the plurality of translators, each translator feature vector including one or more values representing a feature of the translator; and
 assembling the target matrix using a plurality of vectors as columns of the target matrix.

22. The system of claim 13, wherein the method further comprises generating the document content features including a plurality of summarization features of the document including selected sentences from the document.

23. The system of claim 13, wherein generating the input matrix comprises:
 selecting a plurality of sentences representing the document summary feature for inclusion in a summary vector, the sentences selected by a method of:
 encoding each sentence of the document into a vector representation;
 computing a 'centroid' vector as a sum of these vector representations; and
 selecting sentences having a highest cosine similarity to the centroid vector for inclusion in the summary vector;
 assembling the input matrix using the summary vector as a column of the input matrix.

24. The system of claim 13, wherein the document content features include a document keyword feature and generating the input matrix comprises:
 selecting a plurality of keywords and key-phrases;
 generating a keyword vector representation of the plurality of keywords and key-phrases; and
 assembling the input matrix using a keyword vector as a column of the input matrix.

* * * * *